(12) United States Patent
Pengg et al.

(10) Patent No.: US 8,127,523 B2
(45) Date of Patent: Mar. 6, 2012

(54) LINK MADE FROM A D-PROFILE STEEL LENGTH FOR USE IN A HOIST CHAIN

(75) Inventors: Agyd Pengg, Klagenfurt (AT); Franz Alfred Fuchs, Kapfenberg (AT)

(73) Assignee: Pegwag Austria GmbH, Kapfenberg (AT)

( * ) Notice: Subject to any disclaimer, the term of this patent is extended or adjusted under 35 U.S.C. 154(b) by 126 days.

(21) Appl. No.: 12/740,662

(22) PCT Filed: Jul. 14, 2009

(86) PCT No.: PCT/EP2009/005114
§ 371 (c)(1),
(2), (4) Date: Apr. 29, 2010

(87) PCT Pub. No.: WO2010/009831
PCT Pub. Date: Jan. 28, 2010

(65) Prior Publication Data
US 2010/0293916 A1    Nov. 25, 2010

(30) Foreign Application Priority Data
Jul. 23, 2008 (DE) .......................... 10 2008 034 360

(51) Int. Cl.
*F16G 13/06* (2006.01)
*F16G 13/18* (2006.01)
(52) U.S. Cl. ................. 59/78; 59/84; 474/155
(58) Field of Classification Search ............... 59/78, 80, 59/84, 90, 93; 474/155, 206
See application file for complete search history.

(56) References Cited

U.S. PATENT DOCUMENTS

| | | | | |
|---|---|---|---|---|
| 3,864,906 | A | * | 2/1975 | Cullen ............... 59/84 |
| 4,498,284 | A | * | 2/1985 | Gearhart ............ 59/84 |
| 4,627,232 | A | * | 12/1986 | Bruce ............... 59/84 |
| 5,803,851 | A | | 9/1998 | Walenta et al. |
| 7,107,754 | B2 | * | 9/2006 | Sinz et al. .......... 59/78 |
| 7,231,759 | B2 | * | 6/2007 | Benecke ............ 59/78 |
| 7,389,634 | B1 | * | 6/2008 | Van Niekerk ....... 59/78 |
| 2003/0131580 | A1 | * | 7/2003 | Dalferth et al. ..... 59/78 |
| 2004/0093848 | A1 | * | 5/2004 | Dudley et al. ...... 59/84 |

(Continued)

FOREIGN PATENT DOCUMENTS

DE 939 545 2/1956

(Continued)

OTHER PUBLICATIONS

Hoischen, Hans, "Technical Drawings," 18 ed., W. Girardet Buchverlag GmbH, Essen, 1980, ISBN 3-7736-2018-7, p. 92.

(Continued)

*Primary Examiner* — David Jones
(74) *Attorney, Agent, or Firm* — Patterson Thuente Christensen Pedersen, P.A.

(57) ABSTRACT

A link made from a D-profile steel length, that can be used to form a hoist chain including a substantially planar outer circumferential area and two side flanks opening into the same, each flank comprises a first planar flank section which is substantially perpendicular to the outer circumferential area. The flank section is connected on each side flank with the outer circumferential area via an adjacent planar bevel area which is inclined under a bevel angle obliquely in relation to the same in the direction towards the other side flank.

8 Claims, 2 Drawing Sheets

U.S. PATENT DOCUMENTS

| | | | |
|---|---|---|---|
| 2004/0139719 A1* | 7/2004 | Moehnke et al. | 59/78 |
| 2004/0244354 A1 | 12/2004 | Sinz et al. | |
| 2006/0137322 A1* | 6/2006 | Moehnke et al. | 59/86 |
| 2011/0088367 A1* | 4/2011 | Powell et al. | 59/90 |

FOREIGN PATENT DOCUMENTS

| | | |
|---|---|---|
| DE | 39 29 148 A1 | 1/1991 |
| DE | 201 13 284 U1 | 12/2001 |
| EP | 0 816 717 B1 | 10/2002 |
| EP | 1 440 253 B1 | 4/2006 |
| WO | WO 03/038303 A1 | 5/2003 |

OTHER PUBLICATIONS

DIN ISO 13715; International Standard ISO 13715:2000 "Technical Drawings—Edges of undefined shape—Vocabulary and indications," Dec. 2000.

* cited by examiner

LINK MADE FROM A D-PROFILE STEEL LENGTH FOR USE IN A HOIST CHAIN

PRIORITY CLAIM

The present application is a National Phase Entry of PCT Application No. PCT/EP2009/005114, filed Jul. 14, 2009, which claims priority to German Application Number 102008034360.9, filed Jul. 23, 2008, the disclosures of which are hereby incorporated by reference herein in their entirety.

FIELD OF THE INVENTION

The invention relates to a link made from a D-profile steel length, for use in a hoist chain, comprising a substantially planar outer circumferential area and two side flanks opening into the same, each of which comprises a first planar flank section which is substantially perpendicular to the outer circumferential area. The invention relates further to such hoist chains consisting of such links.

BACKGROUND OF THE INVENTION

A chain with links made from case-hardened D-profile steel lengths is shown in EP 0 816 717 B1, where each link has a substantially planar outer circumferential area in which two side flanks open by forming a sharp edge or a rounded portion with a very small radius of curvature. As a result, only a very low reduction in the profile cross-section of the links is achieved, so that large moments of resistance to bending can be achieved. The maximization of the cross-sectional area is reflected in an increase of the chain tension force and the moments of resistance to bending. Large moments of resistance to bending lead to a high dynamic strength of the chain.

The links of the chain shown in EP 1 440 253 B1 are also made of D-profile steel lengths, in which the rounded portions in the region of the transition between the side flanks and the planar circumferential area are provided with a rounding radius which is equal to 0.2 to 0.4 times the value of the distance between the flanks of the links. This rounding radius, which is larger in comparison than the links of the specification mentioned above, also not only leads to a respectively larger reduction in the cross-sectional area of the profile of the link and thus not only to a certain decrease in the tensile force of the chain, but also to a reduction in the moments of resistance to bending, which on its part leads to a reduction in the dynamic strength of the chain.

SUMMARY OF THE INVENTION

The invention herein provides a link which offers a very high dynamic strength of a chain by maintaining the largest possible cross-sectional area and large moments of resistance to bending.

An embodiment of the invention can be a link formed in such a way that on each side flank a first flank section is connected with an outer circumferential area via an adjacent planar bevel area which is inclined under a bevel angle obliquely in relation to the side flank in the direction towards the other side flank.

One feature of the link in an embodiment of the invention is a bevel on the abutting areas between the side flanks and the planar outer surface of the link. An advantage is thus achieved such that a chain which consists of such links is able to better slide into the orifices of the chain guides of a hoist or the like as a result of this bevel than a chain with a sharp-edged profile or one with only a very small rounded portion in the transitional area between the side flanks and the outer circumferential area. This provides a substantial improvement in the running behavior of such a chain made of links in accordance with the invention in comparison with known links.

Moreover, the bevel in the region of each side flank which is adjacent to the outer circumferential area offers a further advantage that a chain with such links can form a flatter bulk cone in the chain magazine of a hoist or the like and therefore requires a smaller chain magazine or chain container. This allows better utilization of the hoisting height of the hoist.

The arrangement of the bevel in the link in an embodiment of the invention leads to low cross-sectional loss and thus a loss of moment of resistance to bending and breaking force and dynamic strength, compared with the case of a link with a sharp-edged profile. A person skilled in the art can keep the employed bevel size and the loss of profile surface in relation to one another at an appropriate ratio.

One embodiment of the link in accordance with the invention also includes arranging the side flanks in a symmetrical way relative to the central height axis of the link.

One embodiment of the bevel angle of a link in accordance with the invention lies in a range of 10° to 30°.

In one embodiment the direct transitional region between the first flank section of a side flank and the adjacent inclined bevel area and/or between the latter and the outer planar circumferential area is provided with a rounded configuration in a link in an example embodiment of the invention. A rounded portion with a rounding radius of equal size is provided whose magnitude is advantageously equal to 0.04 to 0.1 times the size of the distance between the two side flank sections of the link.

In one embodiment of in a link in accordance with the invention, the bevel areas open in an offset manner into the outer circumferential area laterally in relation to the respectively associated first flank section in a plane of intersection disposed perpendicularly both to the planar outer circumferential area and to the planar first flank section at a distance whose magnitude is equal to 0.02 to 0.15 times the magnitude of the distance between the two first flank sections of the link.

The invention further includes chains comprising links in accordance with the invention.

Chains formed from embodiments of links in accordance with the invention offer more efficient running behavior when entering the chain guides of hoists, especially also in the case of slight lateral offset of the links in relation to the entrance area, and allows for applying higher chain tension forces. At the same time, there are high moments of resistance to bending and very good dynamic strength in chains made from links in accordance with embodiments of the invention.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE DRAWINGS

Figure 1:
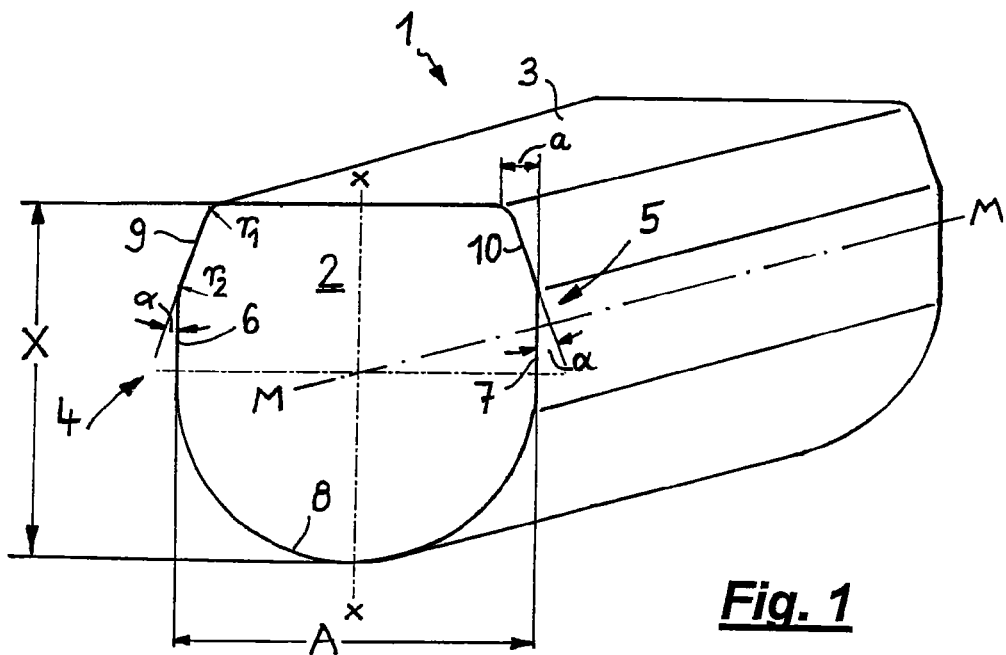
FIG. 1 shows the cross section of a D-profile steel length of a link in accordance with an embodiment of the invention through the middle of one of its side legs, with the plane of intersection being disposed perpendicularly through the central line of the side leg according to the position of intersection I-I according to FIG. 2.
Figure 2:
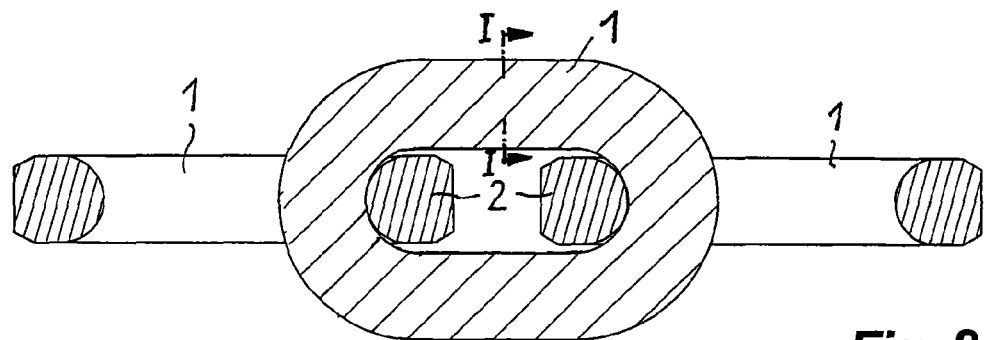
FIG. 2 shows a sectional view through a section of a strand of a chain with three links in accordance with the invention, with the plane of intersection extending through the middle of the two longitudinal legs of the link shown in an upright position.

FIG. 1 shows a section of a side leg of a case-hardened link 1 in a perspective view. This side leg section of the link 1 comprises a longitudinal central line M-M and is intersected at its front end facing the spectator in a plane of intersection which is disposed perpendicularly to the longitudinal central line M-M, with the area of intersection forming a D-profile cross section 2. The position of intersection of FIG. 1 corresponds to the position of intersection I-I as shown in FIG. 2.

The link 1 comprises a planar outer circumferential area 3, two side flanks 4 and 5 which both open into the outer circumferential area 3, and an inner rounded circumferential area 8 facing the inside of the link. As is shown in FIG. 1, the circumferential area 8 generally forms a semi-circular configuration in its cross section, and enters tangentially into the respective side flanks 4 and 5 on each respective side.

Each of the side flanks 4 and 5 comprises a planar flank section 6 and 7 which is spaced from the outer circumferential area 3. Flank sections 6 and 7 that extend parallel with respect to one another and substantially perpendicular to the planar outer circumferential area 3, as shown in the cross section 2 of FIG. 1.

FIG. 1 also depicts planar bevel areas 9 and 10 is adjacent to each of said side flank sections 6 and 7. As shown each bevel area extends in an inclined manner under a bevel angle $\alpha$ in relation to the associated flank section 6 and 7 in the direction towards the opposite side flank 4 and 5 and in the direction towards the outer circumferential area 3.

The two flank sections 6 and 7 are spaced from one another by a distance A in the profile cross section 2.

The cross section 2 in FIG. 1 has a central contour line x-x, in relation to which not only the two side flanks 4 and 5 are arranged symmetrically, but also the entire cross-sectional arrangement.

The total height is X, as measured in the direction of the central contour line x-x.

As is further shown in the illustration of FIG. 1, the transitional area between the flank sections 6 and 7 and the adjacent bevel areas 9 and 10 are provided with a rounded portion with a rounding radius $r_2$.

Each of the two bevel areas 9 and 10 opens on its part via a rounded transitional area (with a rounding radius $r_1$) into the outer circumferential area 3.

The two radii $r_1$ and $r_2$ can be arranged as desired, but in one embodiment both of equal size, such that $r_1=r_2$. Preferably, the magnitude of these radii is chosen as equal to 0.04 to 0.1 times the size of the distance A, the distance between the two first flank sections 6 and 7 of link 1.

As is further shown in FIG. 1, the bevel areas 9 and 10 each open laterally by a distance a from the flank sections 6 and 7 laterally offset into the outer circumferential area 3 in the direction towards the respective opposite side flank 4 and 5, as seen in the cross section 2. Said distance a can be chosen in such a way that it is equal to 0.02 to 0.15 times the magnitude of distance A between the two first flank sections 6 and 7.

The bevel angle $\alpha$ can be chosen in such a way that its magnitude lies in the range of 10° to 30°. Even if preferably a bevel angle $\alpha$ of equal size is used for the inclination of the bevel areas 9 and 10, there can also be applications in which the bevel area 9 extends in an inclined manner under a bevel angle which is slightly different from the bevel area 10. The position of each of the two bevel areas 9 and 10 can still be chosen in such a way that, if desired, both open in a laterally offset manner into the outer circumferential area 3 under a lateral distance a of equal size in relation to the flank section 6 or 7.

FIG. 2 shows a chain strand section with links 1 which are arranged in a 90° twisted manner in the longitudinal direction in relation to each other, with the plane of intersection extending through the two central lines of the side legs of the link 1 as shown in the graphic illustration. FIG. 2 also shows the position of the plane of intersection I-I for the illustration of FIG. 1.

Figure 3:
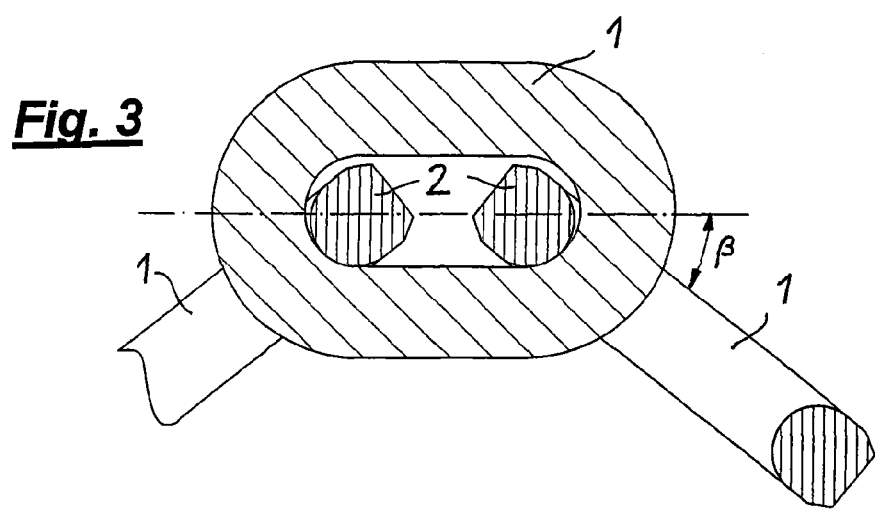
FIG. 3 shows a sectional view according to FIG. 2, with the lateral links hooked into the middle link each being inclined by 40° in relation to the middle link.

In FIG. 2 the links 1 of the illustrated chain strand are aligned in a straight line in relation to one another in the longitudinal direction of the chain strand. FIG. 3 shows a sectional view of a link 1 with two lateral links 1 which are hooked into the same link and which are disposed under the common link at an angle of 40° in relation to the link.

As is shown in FIG. 3, the position of the cross sections 2 of the links can be twisted easily within the receiving width of the link 1 as a result of the bevel areas 9 and 10.

Figure 4:
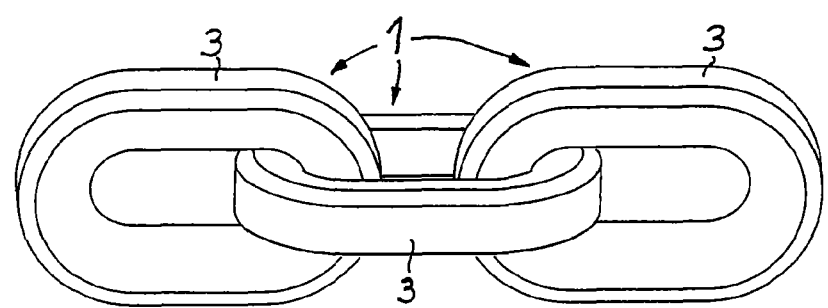
FIG. 4 shows a perspective view of the strand section of FIG. 2.

FIG. 4 finally shows a perspective view of a chain strand section with links 1 in accordance with the invention.

Figure 5:
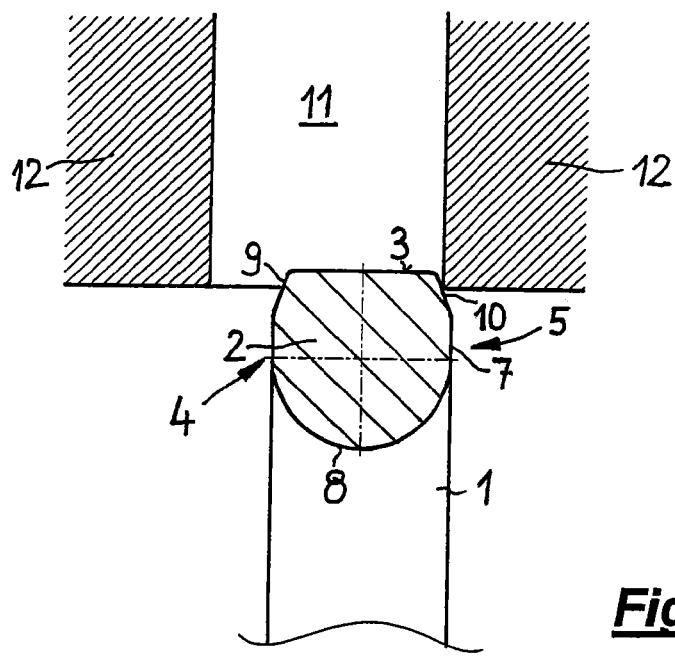
FIG. 5 shows a view of the entrance of a link in accordance with the invention into the guide groove of a chain guide of a chain wheel.

The illustration of FIG. 5 shows the state during the entrance of a link 1 in an embodiment of the invention into the guide groove 11 of a chain guide 12 of a hoist.

As a result of the inclined bevel areas 9 and 10 (relevant in FIG. 5: bevel area 10) which are arranged on the entrance side, the link 1 (and thus also the chain can easily slide at the entrance point into the guide groove 11 of the chain guide 12 of the hoist even in the case of slight lateral offset, which is more difficult in the case of a chain with a sharp-edged profile, thus leading to a substantial improvement in the running behavior of such a chain in comparison with chains with links in which the transitional area between the side flanks and the outer circumferential area is sharp-edged or is provided with an only very small rounded portion.

The invention may be embodied in other specific forms without departing from the spirit of the essential attributes thereof; therefore the illustrated embodiment should be considered in all respects as illustrative and not restrictive, reference being made to the appended claims rather than to the foregoing description to indicate the scope of the invention.

The invention claimed is:

1. A chain link comprising:
   a substantially planar outer circumferential area;
   first and second side flanks disposed on opposite sides of the link, substantially perpendicular to the outer circumferential area, and separated by a link width greater than a width of the outer circumferential area;
   a first planar bevel area joining the outer circumferential area and the first side flank, inclined under a oblique bevel angle of 10° to 30° relative to the first side flank in the direction towards the second side flank;
   a second planar bevel area joining the outer circumferential area and the second side flank, inclined under the oblique bevel angle relative to the second side flank in the direction towards the first side flank; and
   a rounded inner circumferential area facing an inside opening of the link including a semi-circular planar area, the semi-circular planar area joined to both the first and the second side flanks tangentially;

wherein the first planar bevel area opens in a laterally offset manner in relation to the first side flank into the outer circumferential area at a bevel distance of 0.02 to 0.15 times the link width, and the second planar bevel area opens in a laterally offset manner in relation to the second side flank into the outer circumferential area at the bevel distance.

2. A link according to claim 1, wherein the first and second side flanks are arranged in a symmetrical way relative to a central height axis of the link.

3. A link according to claim 1, further comprising:
a rounded first transitional region between the planar bevel area and each of the side flanks; and
a rounded second transitional region between the outer circumferential area and the planar bevel areas.

4. A link according to claim 3, wherein in the first and second transitional regions include a rounding radius with magnitude approximately equal to 0.04 to 0.1 times the link width.

5. A chain including a plurality of links wherein each one of the plurality of links comprises:
a substantially planar outer circumferential area;
first and second side flanks disposed on opposite sides of the link, substantially perpendicular to the outer circumferential area, and separated by a link width greater than a width of the outer circumferential area;
a first planar bevel area joining the outer circumferential area and the first side flank, inclined under a oblique bevel angle of 10° to 30° relative to the first side flank in the direction towards the second side flank;
a second planar bevel area joining the outer circumferential area and the second side flank, inclined under the oblique bevel angle relative to the second side flank in the direction towards the first side flank; and
a rounded inner circumferential area facing an inside opening of the link including a semi-circular planar area, the semi-circular planar area joined to both the first and the second side flanks tangentially;
wherein the first planar bevel area opens in a laterally offset manner in relation to the first side flank into the outer circumferential area at a bevel distance of 0.02 to 0.15 times the link width, and
the second planar bevel area opens in a laterally offset manner in relation to the second side flank into the outer circumferential area at the bevel distance.

6. The chain according to claim 5, wherein the wherein the first and second side flanks are arranged in a symmetrical way relative to a central height axis of the link.

7. The chain according to claim 5, wherein each one of the plurality of links further comprises:
a rounded first transitional region between the planar bevel area and each of the side flanks; and
a rounded second transitional region between the outer circumferential area and the planar bevel areas.

8. The chain according to claim 5 wherein, the first and second transitional regions include a rounding radius with magnitude approximately equal to 0.04 to 0.1 times the link width.

* * * * *